United States Patent
Childers et al.

(10) Patent No.: US 11,104,085 B2
(45) Date of Patent: Aug. 31, 2021

(54) COMPOSITE LAMINATE STRUCTURE HAVING A CELLULAR CORE FORMED USING A CONTINUOUS COMPRESSION MOLDING PROCESS

(71) Applicant: THE BOEING COMPANY, Chicago, IL (US)

(72) Inventors: Christopher Harold Childers, St. Charles, MO (US); Nicholas Sondker, Florissant, MO (US); Michael John Cloud, Snohomish, WA (US); Jason Turner, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 184 days.

(21) Appl. No.: 16/197,051

(22) Filed: Nov. 20, 2018

(65) Prior Publication Data
US 2020/0156333 A1   May 21, 2020

(51) Int. Cl.
*B29C 70/50* (2006.01)
*B32B 3/12* (2006.01)
(Continued)

(52) U.S. Cl.
CPC ............. *B29C 70/50* (2013.01); *B29C 43/22* (2013.01); *B32B 3/12* (2013.01); *B32B 27/08* (2013.01);
(Continued)

(58) Field of Classification Search
CPC . B29C 70/50; B29C 43/22; B29C 2043/3411; B29C 43/28; B29C 43/30;
(Continued)

(56) References Cited

U.S. PATENT DOCUMENTS

| 4,186,044 A | * | 1/1980 | Bradley | ................ B29C 43/224 156/275.5 |
| 5,328,744 A | * | 7/1994 | Kaufmann | .............. B32B 27/06 428/116 |

(Continued)

FOREIGN PATENT DOCUMENTS

| EP | 2479021 B1 | 9/2013 |
| JP | 2003053865 A | 2/2003 |

OTHER PUBLICATIONS

Howell, D. et al., "Compression Molding of Long Chopped Fiber Thermoplastic Composites," <https://www.researchgate.net/publication/290586693_Compression_molding_of_long_chopped_fiber_thermoplastic_composites> retrieved Oct. 4, 2018, 14 pgs.

(Continued)

*Primary Examiner* — Philip C Tucker
*Assistant Examiner* — Brian R Slawski
(74) *Attorney, Agent, or Firm* — Moore IP Law

(57) ABSTRACT

A composite laminate structure includes a cellular core and a first laminate layer coupled to the cellular core. The first laminate layer includes a first thermoplastic layer and a first fiber-reinforced polymer layer, where a first surface of the first fiber-reinforced polymer layer is thermally consolidated to a second surface of the first thermoplastic layer. A first surface of the first thermoplastic layer is directly in contact with and bound to a first surface of the cellular core by temperature reduction of the first thermoplastic layer below a glass transition temperature of the first thermoplastic layer while the cellular core is pressed against the first thermoplastic layer when the first thermoplastic layer is above the glass transition temperature of the first thermoplastic layer and the cellular core is below a temperature where materials of the cellular core flow or degrade.

20 Claims, 3 Drawing Sheets

(51) Int. Cl.
  *B32B 27/08* (2006.01)
  *B32B 37/10* (2006.01)
  *B29C 43/22* (2006.01)
  *B32B 37/04* (2006.01)
  *B29K 101/12* (2006.01)
  *B29C 43/44* (2006.01)
  *B32B 15/08* (2006.01)
  *B29C 43/30* (2006.01)
  *B32B 27/12* (2006.01)
  *B29C 43/28* (2006.01)
  *B29C 43/34* (2006.01)

(52) U.S. Cl.
  CPC ............. *B32B 37/04* (2013.01); *B32B 37/10* (2013.01); *B29C 43/28* (2013.01); *B29C 43/30* (2013.01); *B29C 43/34* (2013.01); *B29C 43/44* (2013.01); *B29K 2101/12* (2013.01); *B32B 15/08* (2013.01); *B32B 27/12* (2013.01); *B32B 2250/40* (2013.01); *B32B 2262/101* (2013.01); *B32B 2262/106* (2013.01); *B32B 2305/024* (2013.01); *B32B 2305/08* (2013.01)

(58) Field of Classification Search
  CPC ........... B29C 43/34; B29C 43/44; B32B 3/12; B32B 27/08; B32B 37/10; B32B 37/04; B32B 2250/40; B32B 2305/024; B32B 2305/08; B32B 29/005; B32B 15/10; B32B 15/043; B32B 15/08; B32B 15/12; B32B 2250/05; B32B 2262/101; B32B 2262/106; B32B 2262/14; B32B 2270/00; B32B 2307/4026; B32B 2471/00; B32B 2605/18; B32B 2607/00; B32B 27/10; B32B 27/12; B32B 27/18; B32B 27/281; B32B 27/285; B32B 27/286; B32B 27/288; B29K 2101/12; B29K 2105/04; B29K 2105/08; B29K 2995/0015; B29L 2007/002; B29L 2009/00
  USPC ....... 156/242, 196, 199, 200, 201, 209, 212, 156/221, 222, 230, 231, 235, 238, 244.27, 156/245, 289, 308.2, 309.6
  See application file for complete search history.

(56) References Cited

U.S. PATENT DOCUMENTS

| | | | |
|---|---|---|---|
| 6,036,802 A * | 3/2000 | Banks | B29C 53/04 156/197 |
| 7,807,005 B2 | 10/2010 | Rubin et al. | |
| 8,491,745 B2 | 7/2013 | Wilkerson et al. | |
| 8,795,457 B2 | 8/2014 | Rubin et al. | |
| 10,618,213 B2 * | 4/2020 | Childers | B32B 27/20 |
| 2005/0239272 A1 * | 10/2005 | Ruttkowski | B81C 1/00357 438/597 |
| 2011/0003163 A1 * | 1/2011 | Wood | B29C 43/3642 428/525 |
| 2011/0177348 A1 * | 7/2011 | Yomo | B05D 7/574 428/441 |
| 2011/0311811 A1 * | 12/2011 | Collette | B29C 70/025 428/373 |
| 2018/0236732 A1 * | 8/2018 | Childers | B29C 51/42 |
| 2018/0236734 A1 * | 8/2018 | Childers | B32B 3/28 |

OTHER PUBLICATIONS

Pflug, J. et al., "Continuously Produced Honeycomb Cores," In Sample Journal, Nov. 2003, <https://www.researchgate.net/publication/291141551> retrieved Oct. 4, 2018, 11 pgs.

* cited by examiner

COMPOSITE LAMINATE STRUCTURE HAVING A CELLULAR CORE FORMED USING A CONTINUOUS COMPRESSION MOLDING PROCESS

FIELD OF THE DISCLOSURE

The present disclosure is related to composite laminate structure with a cellular core formed using a continuous compression molding (CCM) process.

BACKGROUND

A composite laminate structure having a cellular core may include a cellular core sandwiched between polymer face sheets. Such composite laminate structures are used for many purposes including, but not limited to, flooring, paneling for homes, aircraft, watercraft, and container walls. The cellular core stiffens the composite laminate structure and includes cells (e.g., air pockets) to reduce weight of the composite laminate structure as compared to a similar structure made from solid material. One way to form such a composite laminate structure is to laminate polymer sheets to the cellular core with an adhesive that forms a thermoset material (e.g., an epoxy). Using an adhesive to couple polymer sheets to the cellular core may inhibit or prevent subsequent reshaping of the composite laminate structure without causing damage to the composite laminate structure. Another way to form a composite laminate structure is to draw heated face sheets onto a cellular core in a reduced pressure environment. Drawing the face sheets onto the core may undesirably result in a composite laminate structure that telegraphs surface features of the core at outer surfaces of the composite laminate structure. Thus, a need exists for forming a composite laminate structure with a cellular core that allows for subsequent reshaping of the composite laminate structure and has minimal or no core telegraphing at outer surfaces of the composite laminate structure.

SUMMARY

According to one implementation of the present disclosure, a method of forming a composite laminate structure having a cellular core in a CCM process includes advancing a stack in increments via a drive mechanism of a CCM machine into a heating zone of the CCM machine. The stack includes the cellular core, one or more thermoplastic layers, and one or more fiber-reinforced polymer layers. A first thermoplastic layer of the one or more thermoplastic layers is positioned between the cellular core and a first fiber-reinforced polymer layer of the one or more fiber-reinforced polymer layers. The method includes pressing the stack together with the CCM machine in the heating zone. The stack is pressed together to a thickness that is less than or equal to a thickness of the stack as received via the drive mechanism. Concurrently with pressing the stack together, the method includes applying heat to the stack. The heat is sufficient to exceed glass transition temperatures of both the one or more thermoplastic layers and one or more carrier polymers of the one or more fiber-reinforced polymer layers in a portion of the heating zone. The method also includes advancing the stack in increments via the drive mechanism into a cooling zone of the CCM machine. The cooling zone reduces temperatures of the one or more thermoplastic layers and the one or more carrier polymers below the glass transition temperatures.

According to another implementation of the present disclosure, a method of forming a composite laminate structure having a cellular core in a CCM process includes receiving a stack via a drive mechanism of a CCM machine. The stack includes the cellular core between first thermoplastic layers, the first thermoplastic layers between fiber-reinforced polymer layers, the fiber-reinforced polymer layers between second thermoplastic layers, and the second thermoplastic layers between release layers treated with a release agent. The method includes pressing, in a heating zone of the CCM machine, the stack together to a thickness less than, or equal to, a thicknesses of the stack as received via the drive mechanism at the CCM machine. The method includes, concurrently with pressing the stack together, applying heat to the stack. The heat is sufficient to exceed glass transition temperatures of the first thermoplastic layers, carrier polymers of the fiber-reinforced polymer layers, and the second thermoplastic layers in a portion of the heating zone. The heat is insufficient to degrade the cellular core, or enable one or more materials of the cellular core to flow, during a time that the materials are in the heating zone. The method also includes, cooling the stack in a cooling zone of the CCM machine to reduce temperatures of the first thermoplastic layers, the carrier polymers of the fiber-reinforced polymer layers, and the second thermoplastic layers below the glass transition temperatures.

According to another implementation of the present disclosure, a composite laminate structure includes a cellular core and a first laminate layer coupled to the cellular core. The first laminate layer includes a first thermoplastic layer and a first fiber-reinforced polymer layer, where a first surface of the first fiber-reinforced polymer layer is thermally consolidated to a second surface of the first thermoplastic layer. A first surface of the first thermoplastic layer is directly in contact with and bound to a first surface of the cellular core by temperature reduction of the first thermoplastic layer below a glass transition temperature of the first thermoplastic layer while the cellular core is pressed against the first thermoplastic layer when the first thermoplastic layer is above the glass translation temperature of the first thermoplastic layer and the cellular core is below a temperature where materials of the cellular core flow or degrade.

DETAILED DESCRIPTION

Particular embodiments of the present disclosure are described below with reference to the drawings. In the description, common features are designated by common reference numbers throughout the drawings.

The figures and the following description illustrate specific exemplary embodiments. The figures are not drawn to scale. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
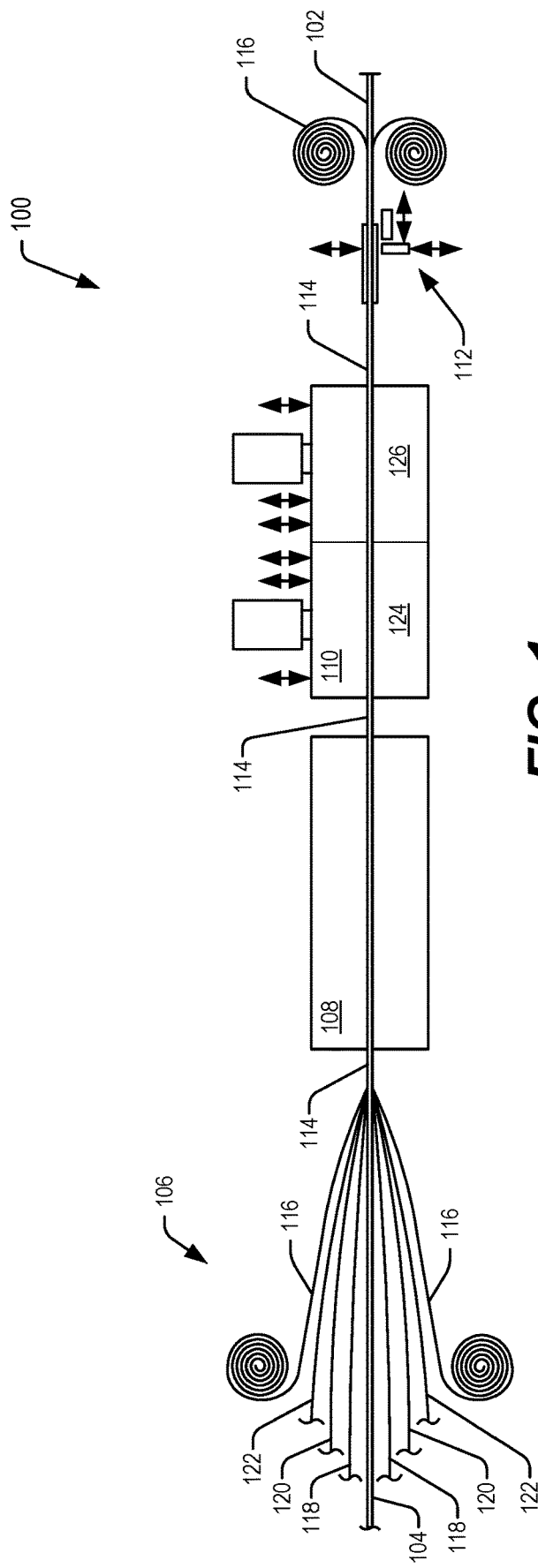
FIG. 1 is a diagram of system for forming a composite laminate structure having a cellular core.

FIG. 1 is a diagram of a continuous compression molding (CCM) fabrication line 100 to form a composite laminate structure 102 having a cellular core 104. In FIG. 1, the CCM fabrication line 100 includes a stack formation zone 106, a pre-forming zone 108, a CCM machine 110, and a drive mechanism 112. The drive mechanism 112 pulls the composite laminate structure 102 from the CCM machine 110. In other embodiments, the drive mechanism 112 pushes a stack 114 of material used to form the composite laminate structure 102 into the CCM machine 110, or the CCM fabrication line 100 includes multiple drive mechanisms that allow the stack 114 to be pushed into the CCM machine 110 and the composite laminate structure 102 to be pulled from the CCM machine 110. The stack 114 and the composite laminate structure 102 can be guided through the CCM fabrication line 100 by guides, rollers, other support structures, or combinations thereof (not shown).

The CCM fabrication line 100 enables formation of the composite laminate structure 102 without the use of thermoset materials (e.g., thermoset adhesives such as epoxies) and without the use of reduced pressure (e.g., vacuum) to bind the cellular core 104 to laminate layers and to consolidate thermoplastic layers into laminate layers. Advantageously, forming the composite laminate structure 102 without the use of thermoset materials enables subsequent shaping of the composite laminate structure 102 within tolerances allowed by the cellular core 104 by application of heat and shaping force to the composite laminate structure 102 without causing physical damage at interfaces between thermoplastic layers of the composite laminate structure 102 and without separating the laminate layers from the cellular core 104. Advantageously, forming the composite laminate structure 102 without the use of vacuum or a reduced pressure environment enables minimal or no telegraphing of features of the core at outer surfaces of the composite laminate structure 102.

In the stack formation zone 106 of the CCM fabrication line 100, multiple plies of materials that will form the composite laminate structure 102 are stacked together to form the stack 114. Materials for the stack 114 can be supplied as blanks of particular lengths, can be suppled from material rolls, or combinations thereof. In some embodiments, release layers 116 treated with a release agent are included in the stack 114. The release layers 116 can include 301 stainless steel foil and the release agent can include Frekote 700-NC (available from Henkel Corporation, Rocky Hill, Conn.). In the embodiment of FIG. 1, the release layers 116 are grasped by the drive mechanism 112 of the CCM fabrication line 100 to move the stack 114 and the composite laminate structure 102 through the CCM fabrication line 100. The release layers 116 are removed from the composite laminate structure 102 after the stack passes the drive mechanism 112.

Figure 2:
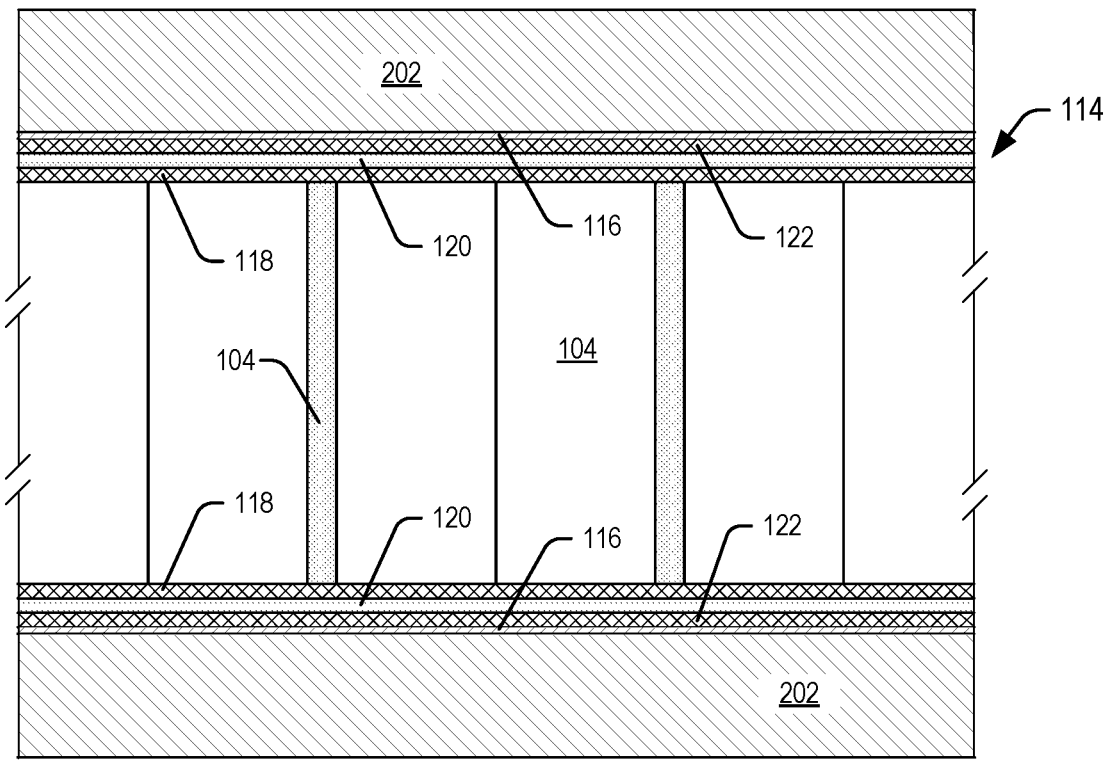
FIG. 2 is cross-sectional representation of an embodiment of a portion of a stack used to form a composite laminate structure having a cellular core, where the stack is positioned in a CCM machine.

FIG. 2 depicts a cross-sectional representation of a portion of the stack 114 of layers for a particular embodiment positioned in the CCM machine 110 before consolidation of the stack 114 occurs. The stack 114 of FIG. 2 includes the cellular core 104. The cellular core 104 can include a hollow cellular pattern (e.g., a honeycomb pattern) and be formed of a thermoset material paper core (e.g., an aramid paper core). In other embodiments, the cellular core 104 can have a different hollow cellular pattern than the hexagonal pattern of a honeycomb pattern (e.g., circles, ovals, squares, rectangles, etc.), can be made of a different material (e.g., a metal, a thermoplastic that will not significantly soften at temperatures obtained by the cellular core during formation of the composite laminate structure 102, a thermoset polymer and a thermoplastic combination, or combinations thereof), or both. In some embodiments, the cellular core 104 includes two or more separate cellular cores stacked together.

The cellular core 104 of FIG. 2 is sandwiched between first thermoplastic layers 118. The first thermoplastic layers 118 can include polyetherimide ("PEI"), polyetheretherketone ("PEEK"), polyetherketoneketone ("PEKK"), polyphenylsulfone ("PPS"), other thermoplastics, or combinations thereof. The particular thermoplastic used can be selected from a group of thermoplastics with a glass transition temperature that will not cause thermal degradation, or flow of materials, of the cellular core 104 during formation of the composite laminate structure 102. The first thermoplastic layers 118 can include one or more dyes, other additives, or both, that influence physical properties of the first thermoplastic layers 118. In some embodiments, a first one of the first thermoplastic layers 118 that abuts a first side of the cellular core 104 is a different material than a second one of the first thermoplastic layers 118 on a second side of the cellular core 104.

The first thermoplastic layers 118 of FIG. 2 is sandwiched between fiber-reinforced polymer layers 120. The fiber-reinforced polymer layers 120 include fibers in a carrier polymer. The carrier polymer can be the same as, or different from, the thermoplastic of the first thermoplastic layers 118. The carrier polymer can include a dye, other additives, or both that influence physical properties of the fiber-reinforced thermoplastic layers. The fibers can be carbon fibers, glass fibers (e.g., s-type or e-type), polymer fibers of material different than the carrier polymer, or combinations thereof. The fibers can be oriented in the carrier polymer in a unidirectional or non-uniform arrangement. The relative types, thicknesses, amounts of fibers, and orientation of fibers within the carrier polymer, as well as the type of carrier polymer, can vary greatly based on numerous factors (e.g., processing properties and desired physical and mechanical properties of the composite laminate structure 102).

In some embodiments, the fiber-reinforced polymer layers 120 are sandwiched between second thermoplastic layers 122. In other embodiments, the stack 114 does not include the second thermoplastic layers 122. The second thermoplastic layers 122 enable outer surfaces of the composite laminate structure 102 to have desired characteristics (e.g., texture and coloring) that are difficult to achieve with the fiber-reinforced polymer layers 120. In other embodiments, the stack 114 include one or more additional layers.

Referring again to FIG. 1, the stack 114 passes from the stack formation zone 106 to the pre-forming zone 108. The pre-forming zone 108 heats the stack and uses guides, mandrels, other tooling elements, or combinations thereof, to pre-shape the stack 114. The stack 114 is heated to a temperature high enough for portions of the stack 114 to bend, but below a temperature that allows one or more layers of the stack 114 to flow. The pre-forming zone 108 introduces one or more curves into the stack 114, forms the stack 114 into a particular shape (e.g., a c-shape, a z-shape, a hat-stiffener shape, or other shape), or combinations thereof. The stack 114 leaving the pre-forming zone 108 has the general shape of the composite laminate structure 102 produced by the of the CCM fabrication line 100 and enables formation of a shaped laminate. In some embodiments, the pre-forming zone 108 is not used. For example, the composite laminate structure 102 is formed in planar sheets without using a pre-forming zone 108.

The drive mechanism 112 of FIG. 1 incrementally moves the stack 114 in steps from the pre-forming zone 108, or from the stack formation zone 106 when the pre-forming zone 108 is not utilized, to the CCM machine 110. When the drive mechanism 112 is engaged, the drive mechanism 112 vertically lifts the stack 114 to disengage the stack 114 from bottom platens in the CCM machine 110 and moves the stack horizontally forward by a particular distance.

As the stack 114 moves into the CCM machine 110, the stack 114 enters a heating zone 124 of the CCM machine 110. In the heating zone 124, platens (e.g., platens 202 depicted in FIG. 2) of the CCM machine 110 close against the stack 114 and apply pressure and heat to the stack 114 for a pressing time. After the pressing time, the platens release the stack 114, the stack 114 is moved forward by the drive mechanism 112, and the platens are again engaged to apply pressure and heat to the stack 114 for another pressing time. When the platens are closed against the stack 114, vertical travel distance of the platens is controlled. In an embodiment, the travel distance is controlled to avoid mechanical failure of the cellular core 104 (i.e., to avoid crushing the cellular core 104). One or more of the platens can include a textured surface that imparts texturing to outer surfaces of the composite laminate structure 102 produced by the of the CCM fabrication line 100. In other embodiments, texturing of one or more outer surfaces of the composite laminate structure 102 is achieved using a textured blanket between the platens and the stack 114 or by post formation processing (e.g., heating at least one outer surface of the composite laminate structure 102 and using a textured roller to texture the at least one outer surface). In some embodiments, no texturing is applied to the surfaces of the composite laminate structure 102.

The pressing time and the advance time for a step are controlled in the heating zone 124 so that a temperature of the first thermoplastic layers 118 that abut the cellular core 104 exceed glass transition temperatures of the thermoplastic material of the first thermoplastic layers 118 in a portion of the heating zone 124. Heat is conductively applied from the platens to the stack 114 during the pressing time. Temperatures of the platens are controlled so that the heat applied to the thermoplastic layers 118, 122 and the fiber-reinforced polymer layers 120 is insufficient to degrade the layers and is sufficient to raise temperatures of thermoplastic materials of the layers above glass transition temperatures. Raising the temperature of the thermoplastic materials above glass transition temperatures and applying pressure to the stack 114 via the platens enables interaction of the thermoplastics materials at thermoplastic-thermoplastic interfaces so that the thermoplastics will consolidate when subsequently cooled below the glass transition temperatures. Raising the temperature of the first thermoplastic layers 118 that abut the cellular core 104 and applying pressure via the platens enables portions of the first thermoplastic layers 118 to flow adjacent to the cellular core 104 so that the first thermoplastic layers 118 can bind to the cellular core 104 when the temperature of the first thermoplastic layers 118 are subsequently reduced below the glass transition temperature.

As the stack 114 continues to move in the CCM machine 110, the stack 114 passes into a cooling zone 126. In the cooling zone, platens of the CCM machine 110 are maintained at lower temperatures than in the heating zone 124 so that heat is conductively transferred from the stack 114 to the platens. The transfer of heat from the stack 114 to the platens in the cooling zone 126 reduces temperatures of the thermoplastic materials in the stack 114 below glass transition temperatures. Reducing the temperatures of the thermoplastic materials in the stack 114 below the glass transition temperatures can cause the first thermoplastic layers 118 to bind to the cellular core 104 and can cause the thermoplastic layers 118, 122 to consolidate with the fiber-reinforced polymer layers 120 to form the composite laminate structure 102. The stack 114 is advanced stepwise through the cooling zone 126 by the drive mechanism 112. In an embodiment, vertical travel distance of the platens in the cooling zone 126 is be controlled to avoid mechanical failure of the cellular core 104 (i.e., to avoid crushing the cellular core 104). In other embodiments, the travel distance of the patens in the cooling zone 126 is controlled to result in mechanical failure of the cellular core 104 (i.e., to have some core crushing of the cellular core 104).

After the release layers 116 are removed from the stack 114, sections of the resulting composite laminate structure 102 are separated from the CCM fabrication line 100. The resulting composite laminate structures 102 can be trimmed and processed to final product. The processing to the final product can include heating the composite laminate structures 102 to temperatures that allow bending without allowing for material flow, and inducing one or more curves in the composite laminate structures to form shaped composite laminate structures.

Figure 3:
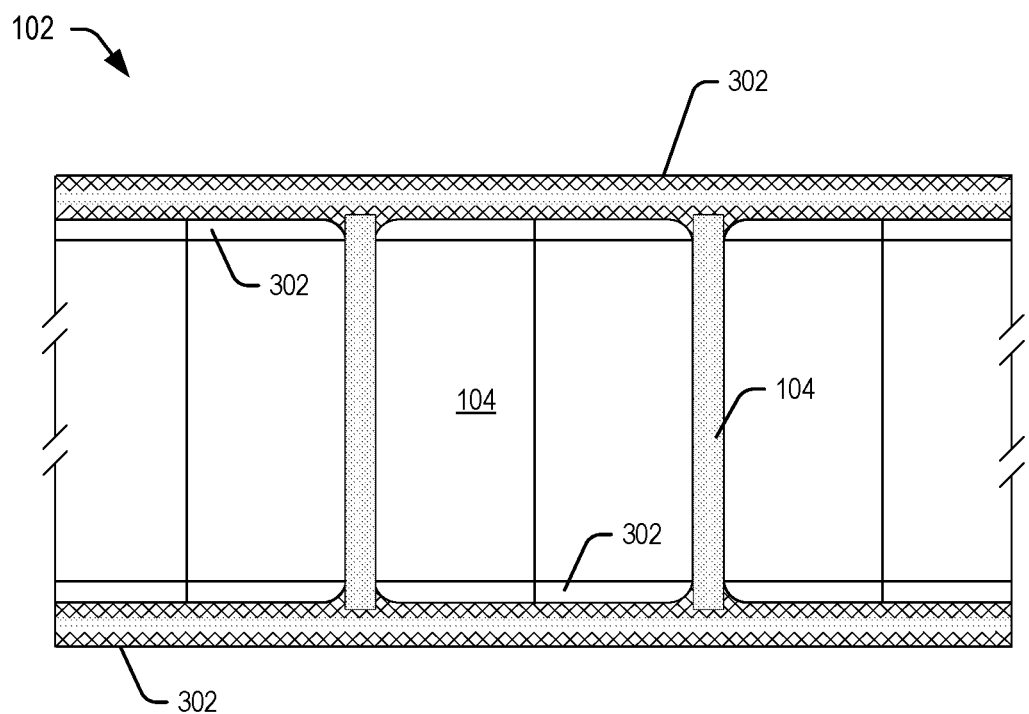
FIG. 3 is a cross-sectional representation of an embodiment a portion of a composite laminate structure having a cellular core.

FIG. 3 depicts a cross-sectional representation of a portion of an embodiment of a composite laminate structure 102. The composite laminate structure 102 can be produced by the CCM fabrication line 100 of FIG. 1. The composite laminate structure 102 includes a cellular core 104 that is bound to and sandwiched between laminate layers 302.

Each laminate layer 302 is formed from at least a thermoplastic layer and a fiber-reinforced polymer layer. A first surface of the thermoplastic layer can be directly in contact with and bound to a first surface of the cellular core. The thermoplastic layer can be bound to the cellular core by temperature reduction of the thermoplastic layer below a glass transition temperature of the thermoplastic layer while the cellular core is pressed against the thermoplastic layer when the thermoplastic layer is above the glass translation temperature of the thermoplastic layer and the cellular core is below a temperature where materials of the cellular core flow or degrade. A second surface of the thermoplastic layer can be thermally consolidated to a first surface of the fiber-reinforced polymer layer. Thermal consolidation is achieved by raising temperatures of the thermoplastic layer and a carrier polymer of the first-reinforced polymer layer above glass transition temperatures and, while applying pressure to the thermoplastic layer and the fiber-reinforced polymer layer to cause at last some interaction of the thermoplastic layer and the fiber-reinforced polymer layer, reducing temperatures of the thermoplastic layer and the fiber-reinforced polymer layer below the glass transition temperatures.

In some embodiments, one or more additional thermoplastic layers, one or more additional fiber-reinforced polymer layers, or combinations thereof are thermally consolidated to the fiber-reinforced polymer layer. For example, a first surface of a second thermoplastic layer is thermally consolidated to a second surface of the fiber-reinforced polymer layer.

Figure 4:
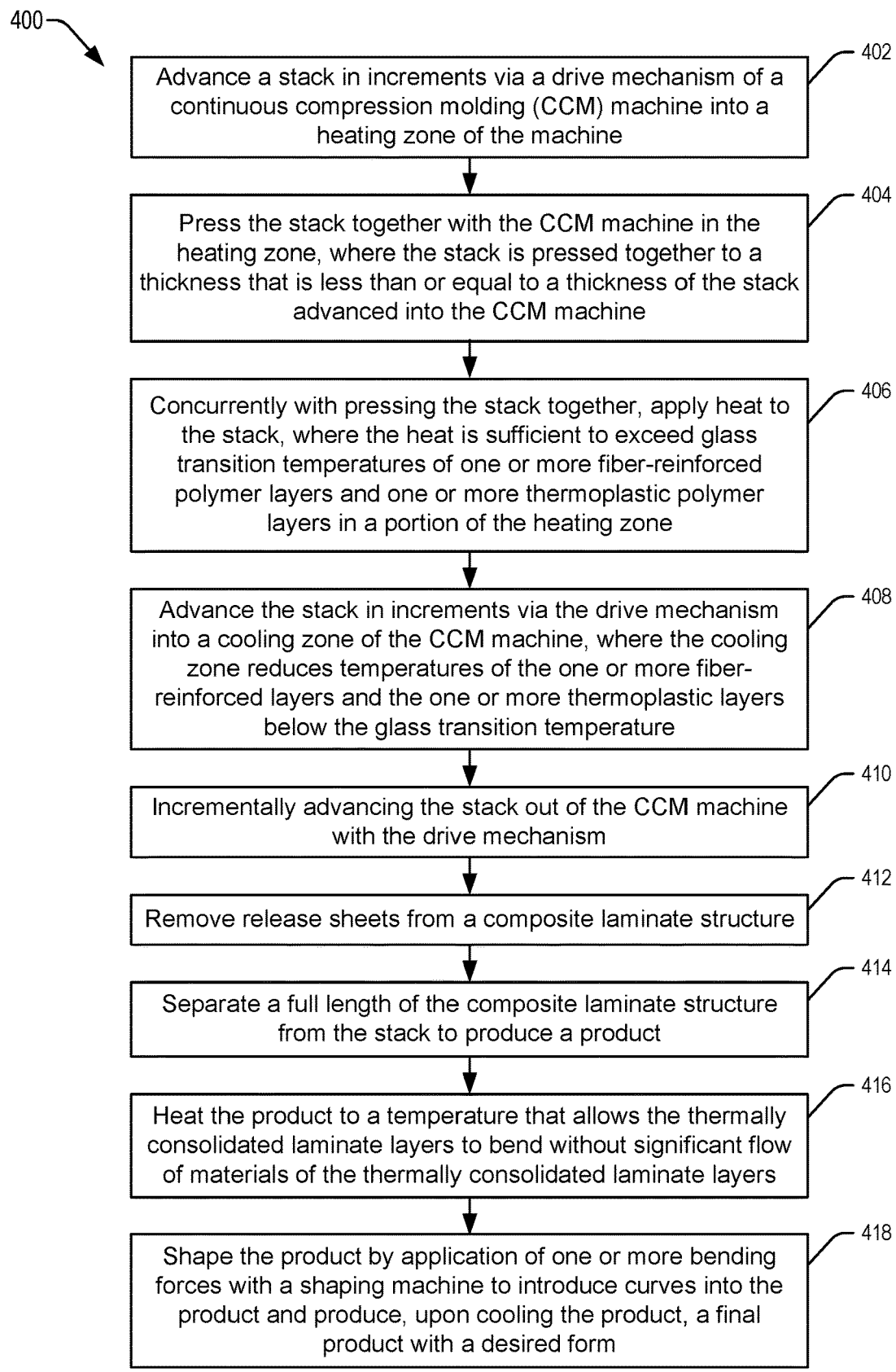
FIG. 4 is a block diagram of a method of forming a composite laminate structure having a cellular core.

FIG. 4 is a block diagram of an embodiment of a method 400 of forming a composite laminate structure having a cellular core. The composite laminate structure can be formed by a CCM process using a machine, such as CCM machine 110 depicted in FIG. 1. The method 400 includes advancing materials in increments via a feed mechanism of the machine into a heating zone of the machine, at 402.

The materials include a cellular core, one or more thermoplastic layers, one or more fiber-reinforced polymer layers, and release sheets. In some embodiments, the cellular core is a metallic core. In other embodiments, the cellular core is formed of a thermoset polymer without including a thermoplastic polymer. In other embodiments, the cellular core is, or, or includes, a thermoplastic polymer.

First thermoplastic layers of the one or more thermoplastic layers are positioned between the cellular core and first fiber-reinforced polymer layers of the one or more fiber-reinforced polymer layers. In an embodiment, first fiber-reinforced polymer layers are sandwiched between second thermoplastic layers of the one or more thermoplastic layers. The second thermoplastic layers are positioned between one or more additional layers of thermoplastic layers, fiber-reinforced polymer layers, or combinations thereof.

The release sheets can be metal foil that abuts outermost layers of the materials that form the composite laminate structure. The release sheets can be treated with a release agent to facilitate removal of the release sheets from the formed composite laminate structure. For a symmetrically formed composite laminate structure with the same number of layers on each side of the cellular core, the outermost layer on one side of the cellular core is one of the one or more thermoplastic layers or one of the one or more fiber-reinforced polymer layers. For a non-symmetrically formed composite laminate structure with a different number of layers on each side of the cellular core, the outermost layers are thermoplastic layers, fiber-reinforced polymer layers, or one thermoplastic layer and one fiber-reinforced polymer layer. The materials do not include adhesive materials to adhere a particular layer to the cellular core or to adhere the particular layer to another layer or layers. The composite laminate structure is formed without the use of a reduced pressure environment.

The method 400 includes pressing the materials together with the machine in the heating zone, at 404. The materials are pressed together to a thickness that is less than or equal to a combined thickness of the materials advanced into the machine. Platens of the machine press the materials together.

Concurrently with pressing the materials together, heat is applied to the materials, at 406. The heat is sufficient to exceed glass transition temperatures of one or more carrier polymers of the one or more fiber-reinforced polymers and the one or more thermoplastic layers in a portion of the heating zone. The heat applied to the materials is insufficient to degrade the cellular core, or enable materials of the cellular core to flow, during a time that the materials are in the heating zone. The heat can be conductively transferred from at least one platen of the machine to the materials.

The method 400 also includes, advancing the materials in increments via the feed mechanism into a cooling zone of the machine, at 408. The cooling zone reduces temperatures of the one or more carrier polymers and the one or more thermoplastic layers below the glass transition temperatures. Reducing the temperatures of the one or more carrier polymers and the one or more thermoplastic layers below the glass transition temperatures can form a thermally consolidated laminate layer and can bind the cellular core to the thermally consolidated laminate layer.

The method 400 can further include incrementally advancing the stack out of the machine with the drive mechanism, at 410, and removing the release sheets from a formed composite laminate structure, 412. A full length of the composite laminate structure can be separated from the stack to produce a product, at 414. In an embodiment, separating a full length of the composite laminate structure from the stack includes cutting the thermally consolidated laminate layers at locations between cellular cores segments in the stack to produce a product. In some embodiments, the product is a final product that is used for desired applications. In other embodiments, the product is subjected to additional processes. For example, one or more outer surfaces of the product are textured to impart texture to the one or more outer surfaces. As another example, the product is shaped to a desired form. To shape the product, the product is heated to a temperature that allows the thermally consolidated laminate layers to bend without allowing for significant flow of materials of the consolidated laminate layers, at 416, and a shaping machine subject the product to one or more bending forces to introduce curves into the product so that a final product produced after cooling the product has a desired shape, at 418.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of forming a composite laminate structure with a cellular core in a continuous compression molding (CCM) process, the method comprising:
    advancing a stack via a drive a drive mechanism of a CCM machine into a pre-forming zone of the CCM machine, the stack including the cellular core, one or more thermoplastic layers, and one or more fiber-reinforced polymer layers, wherein a first thermoplastic layer of the one or more thermoplastic layers is positioned between the cellular core and a first fiber-reinforced polymer layer of the one or more fiber-reinforced polymer layers;
    applying pressure to the stack to shape the stack into a first shape in the pre-forming zone of the CCM machine, wherein the first shape corresponds to a z-shape or a hat-stiffener shape;
    advancing the stack via the drive mechanism of the CCM machine from the pre-forming zone of the CCM machine into a heating zone of the CCM machine;
    pressing the stack together with the CCM machine in the heating zone, wherein the stack is pressed together to a thickness that is less than or equal to a combined thickness of the stack as received by the CCM machine via the drive mechanism;
    applying heat to the stack, the heat sufficient to exceed glass transition temperatures of both the one or more thermoplastic layers and one or more carrier polymers of the one or more fiber-reinforced polymer layers in a portion of the heating zone; and
    advancing the stack via the drive mechanism into a cooling zone of the CCM machine, wherein the cooling zone reduces temperatures of the one or more thermoplastic layers and the one or more carrier polymers below the glass transition temperatures.

2. The method of claim 1, further comprising, subsequent to release of the composite laminate structure from the CCM machine, heating the composite laminate structure and shaping the composite laminate structure into a desired form.

3. The method of claim 1, wherein the drive mechanism advances the stack by disengaging the stack from a platen of the CCM machine and moving the stack forward by a particular distance.

4. The method of claim 1, wherein the stack is advanced through the CCM machine in steps such that platens of the CCM machine press the stack together for a pressing time, release the stack, and the drive mechanism advances the stack a step.

5. The method of claim 4, wherein at least some of the platens include texturing to impart texture to one or more outer surfaces of the composite laminate structure.

6. The method of claim 1, wherein the heat applied to the stack is insufficient to degrade the cellular core, or enable materials of the cellular core to flow, during a time that the materials are in the heating zone.

7. The method of claim 1, wherein the stack comprise a release layer and a release agent applied to the release layer to promote release of the release layer from a laminate layer.

8. The method of claim 1, wherein platens of the CCM machine press the stack together, and wherein travel distance of the platens is controlled to avoid mechanical failure of the cellular core.

9. The method of claim 1, wherein the stack does not include a thermoset material or other adhesive to bind layers of a laminate layer of the composite laminate structure together.

10. The method of claim 1, wherein the one or more fiber-reinforced polymer layers include fibers in a carrier polymer, and wherein the fibers comprise carbon fibers, glass fibers, polymer fibers of material different than the carrier polymer, or combinations thereof.

11. The method of claim 1, wherein the one or more thermoplastic layers include a second thermoplastic layer consolidated to the first fiber-reinforced polymer layer.

12. The method of claim 1, wherein:
    the cellular core is between first thermoplastic layers of the one or more thermoplastic layers, the first thermoplastic layers including the first thermoplastic layer,
    the first thermoplastic layers are between fiber-reinforced polymer layers of the one or more fiber-reinforced polymer layers,
    the fiber-reinforced polymer layers are between second thermoplastic layers of the one or more thermoplastic layers,
    the second thermoplastic layers are between release layers treated with a release agent, and
    the heat is insufficient to degrade the cellular core, or enable one or more materials of the cellular core to flow, during a time that the materials are in the heating zone.

13. The method of claim 12, wherein cooling the stack comprises conductively transferring heat from the stack to at least one platen of the CCM machine.

14. The method of claim 12, wherein a first surface of the first thermoplastic layer directly contacts a first surface of the cellular core.

15. The method of claim 1, wherein, after the stack has advanced through the cooling zone, an outer surface of the first fiber-reinforced polymer layer of the one or more fiber-reinforced polymer layers is devoid of indications of surface features of a first surface of the cellular core that the first fiber-reinforced polymer layer is coupled to via the first thermoplastic layer.

16. The method of claim 15, wherein the stack further comprises a second thermoplastic layer of the one or more thermoplastic layers, the second thermoplastic layer in contact with a second surface of the cellular core, the second surface opposite the first surface.

17. The method of claim 16, wherein the stack further comprises a second fiber-reinforced polymer layer of the one or more fiber-reinforced polymer layers, the second fiber-reinforced polymer layer in contact with the second thermoplastic layer.

18. The method of claim 17, wherein the stack further comprises a third thermoplastic layer of the one or more thermoplastic layers, the third thermoplastic layer in contact with the second fiber-reinforced polymer layer.

19. The method of claim 1, wherein the stack further comprises a second thermoplastic layer of the one or more thermoplastic layers, the second thermoplastic layer in contact with the first fiber-reinforced polymer layer.

20. The method of claim 1, wherein the cellular core comprises a hollow cellular pattern.

\* \* \* \* \*